E. S. Hutchinson,
Extracting Oils.
No. 105,688. Patented July 26, 1870.
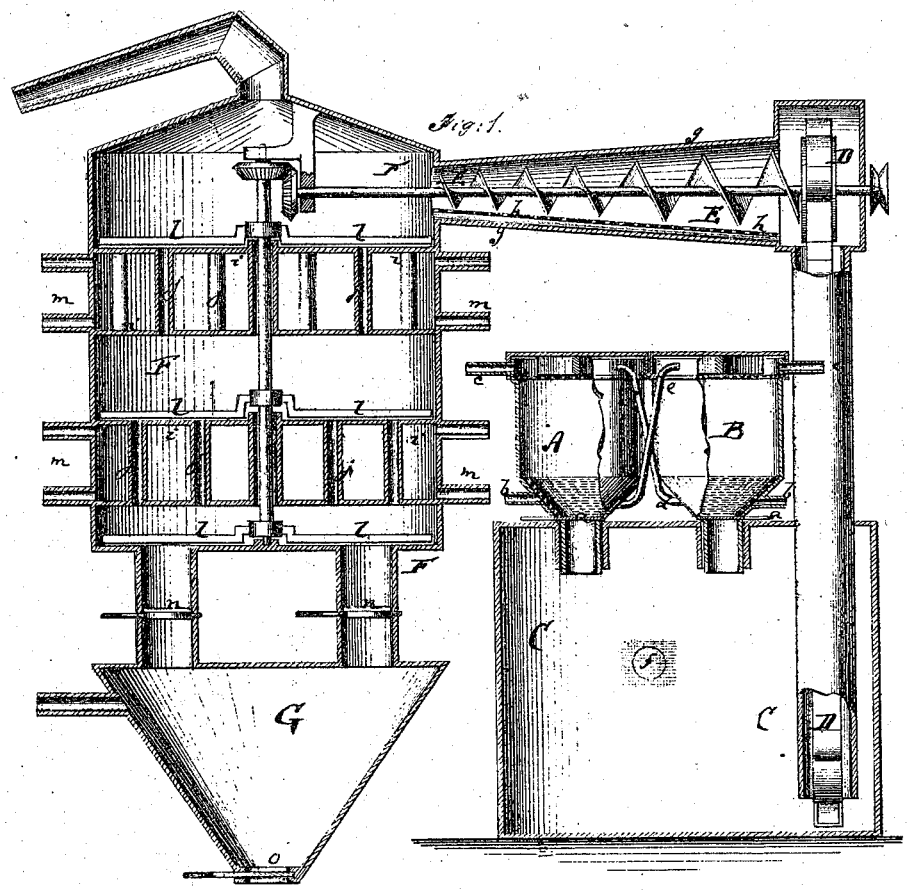
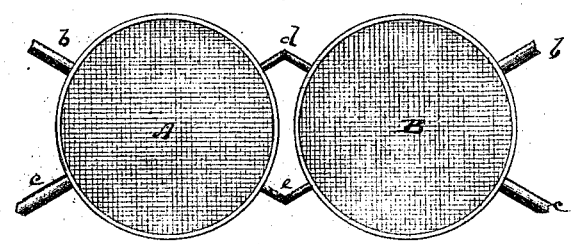

UNITED STATES PATENT OFFICE.

ELIAS S. HUTCHINSON, OF BALTIMORE, MARYLAND.

IMPROVEMENT IN APPARATUS FOR REMOVING OIL FROM SEEDS, MEAL, &c.

Specification forming part of Letters Patent No. 105,688, dated July 26, 1870.

*To all whom it may concern:*

Be it known that I, ELIAS S. HUTCHINSON, of Baltimore, in the county of Baltimore and State of Maryland, have invented a new and Improved Apparatus for Removing Oil from Oleaginous Seeds, Meal, &c.; and I do hereby declare that the following is a full, clear, and exact description thereof, which will enable others skilled in the art to make and use the same, reference being had to the accompanying drawing, forming part of this specification, in which—

Figure 1 represents a vertical longitudinal section of my improved apparatus for removing oil. Fig. 2 is a detail plan view of the paired vats.

Similar letters of reference indicate corresponding parts.

This invention relates to a novel apparatus for separating oil from seeds, grain, meal, &c., and, in fact, from all vegetable oleaginous matter, by means of bisulphide of carbon or other chemical.

The invention consists, chiefly, in the arranging the separating-vats in pairs, so that a continuous process can be carried on, the two vats of each pair serving to supply each other alternately, as hereinafter more fully described.

The invention consists, also, in the employment, below said vats, of a reservoir or tank, into which the meal or other matter is discharged, and in the use of a conveyer for transferring the meal from the tank to the still.

Finally, the invention consists in a novel construction of still for evaporating the bisulphide and drying the meal, the said still consisting of a series of heating-shelves and stirrers for spreading the meal.

A and B in the drawing are two upright vats, of cylindrical or other suitable shape, made of suitable material, with funnel-shaped bottoms. The two vats are set upon the cover of a tank, C, and have slides $a$ in their bottoms for discharging their contents into said tank. The grain, meal, or seed to be treated is filled into the vats A B. The bisulphide of carbon or other chemical is then let into the lower part of the vat A through a pipe, $b$. The bisulphide rises in the vat and permeates the mass of material therein, carrying away the oil, and is discharged through a pipe, $c$, from the upper part of the vat into a suitable receptacle, together with the oil which it has absorbed. When the bisulphide discharged from the vat ceases to be fully charged with oil, it is not allowed to escape into the oil-receptacle, but is, through a pipe, $d$, conducted into the lower part of the vat B, and rises therein to absorb the oil from the contents of the second vat. When the supply of oil in B is insufficient to saturate the bisulphide, the latter is conducted through a pipe, $e$, to the lower part of A, to rise again in the latter. The vat B has also pipes $b'$ and $c$, for independent supply and discharge. After the meal in one vat has been thoroughly separated from the oil, the slide $a$ is opened and the contents are discharged into the tank C. In the meantime the process can be carried on in the other vat, and the emptied vat can be immediately filled from above by opening the cover. The dumping process heretofore employed is thus dispensed with, and the consequent isolation and secure packing of each vat.

The tank C has an overflow-pipe, $f$, for the discharge of superfluous liquid, should the same rise too high. From the bottom of the tank C the meal, which is partly saturated with the bisulphide, is, by a belt-elevator, D, and screw-conveyer E, or equivalent appliances, transferred to the upper part of a still, F. Under the screw E is, in its surrounding case or shell, $g$, arranged a sieve, $h$, through which the liquid may drip to flow back to the tank, economizing thereby considerable power and material during distillation.

The still is provided with a series of heating-shelves, $i$ $i$, that are traversed by vertical pipes $j$ $j$. In the center of the still is set up a vertical rotating shaft, $k$, which has arms or stirrers $l$ $l$ above each shelf, as shown. The meal falling upon the top shelf is spread out on the same by the stirrers $l$ and slowly swept through the pipes $j$. It falls then upon the next shelf, and is there spread and stirred in the same manner, and so on until the meal arrives in a perfectly dry state at the bottom of the still.

The shelves are heated by means of water or other suitable liquid let into them through pipes $m$ $m$, or otherwise. The spreading of the meal on the shelves is important, as in large masses the bisulphide does not readily evaporate.

By opening a slide or slides, $n$, in the bottom of the still, the dry meal can be drawn off into a chamber, G, whence it is, through an opening, $o$, finally discharged. A vacuum is produced in the chamber G by suitable means, preparatory to the opening of the slide $n$, for the purpose of preventing air from entering the still, and from interfering with the process of distillation.

A suitable number of vats, A B, may be arranged in pairs upon the tank C.

Having thus described my invention, I claim as new and desire to secure by Letters Patent—

1. The vats A B, arranged in pairs above the tank C, and connected with each other by means of pipes $d$ $e$, substantially as herein shown and described, for the purpose of allowing continuous operation, as specified.

2. The application to the tank C of vats A B, which are provided with slides $a$ $a$, for dumping their contents without being disturbed, as specified.

3. The screw-conveyer E, or its equivalent, applied in combination with the tank C and still F, as specified.

4. The sieve $h$, arranged under the screw, substantially as and for the purpose herein shown and described.

5. The still F, provided with heating-shelves and stirrers, substantially as herein shown and described, to operate as set forth.

6. The chambers G, arranged under the lower end of the still, substantially as herein shown and described.

ELIAS S. HUTCHINSON.

Witnesses:
 MONTGOMERY WEAVER,
 WILLIAM M. BABBOLT.